United States Patent [19]

Imura

[11] 4,077,041
[45] Feb. 28, 1978

[54] PHOTOGRAPHIC CAMERA EMPLOYING A CARTRIDGE FILM

[75] Inventor: Toshinori Imura, Sakai, Japan

[73] Assignee: Minolta Camera Kabushiki Kaisha, Osaka, Japan

[21] Appl. No.: 670,025

[22] Filed: Mar. 24, 1976

[30] Foreign Application Priority Data

Apr. 1, 1975 Japan .................................. 50-40000

[51] Int. Cl.² ................................................ G03B 7/00
[52] U.S. Cl. ........................................ 354/21; 354/288
[58] Field of Search ................. 354/21, 289, 275, 288, 354/174, 202, 219; 352/78 C

[56] References Cited

U.S. PATENT DOCUMENTS

| | | | |
|---|---|---|---|
| 3,110,215 | 11/1963 | Jenkins et al. | 354/289 X |
| 3,470,799 | 10/1969 | Engelsmann et al. | 354/21 |
| 3,570,382 | 3/1971 | Neudecker | 354/21 |
| 3,672,279 | 6/1972 | Hackenberg et al. | 354/288 |
| 3,678,827 | 7/1972 | Eagle et al. | 354/21 |

*Primary Examiner*—Edna M. O'Connor

*Attorney, Agent, or Firm*—Wolder & Gross

[57] ABSTRACT

A photographic camera employing a cartridge film, has no film sensitivity setting arrangement but has been preset to a predetermined film sensitivity. The cartridge has an index member projecting from a side thereof and is notched to provide a predetermined configuration corresponding to the particular sensitivity rating of the film contained in the cartridge. Disposed within a cartridge chamber of the camera is a sensing member for detecting the sensitivity of the film contained in said cartridge from the particular configuration of the index member. The sensing member is operatively associated with control means for rendering the camera photographically inoperative. The sensing member functions in such a manner that, when the camera is loaded with a cartridge of film having a predetermined sensitivity, it actuates the control means to render the camera photographically operative and upon loading with a cartridge of film having a different sensitivity, actuates the same means to render the camera photographically inoperative.

11 Claims, 10 Drawing Figures

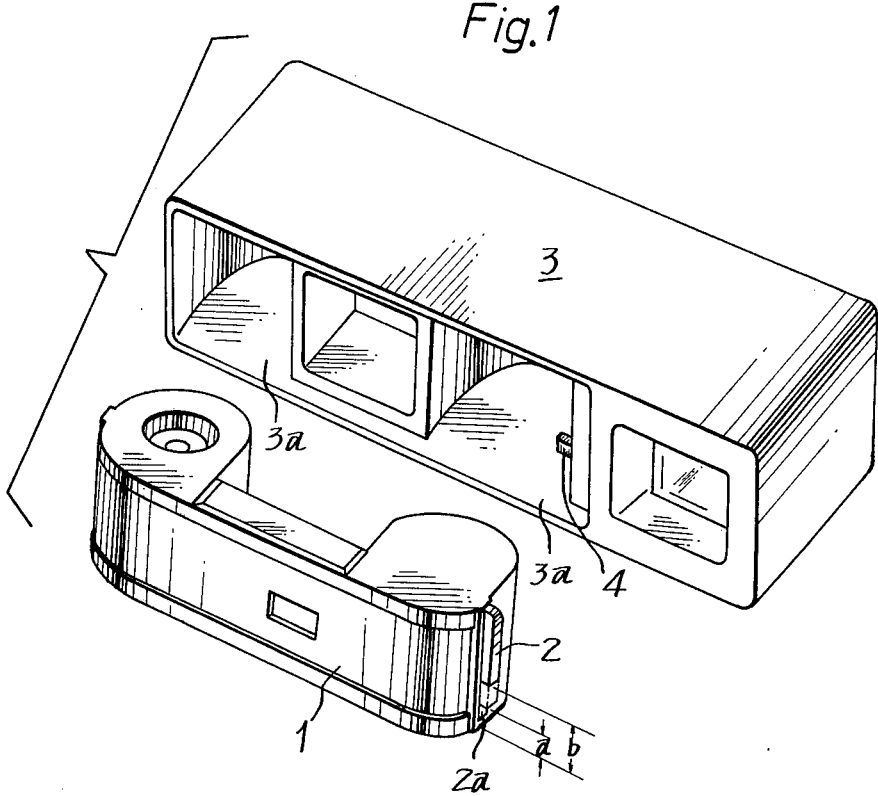
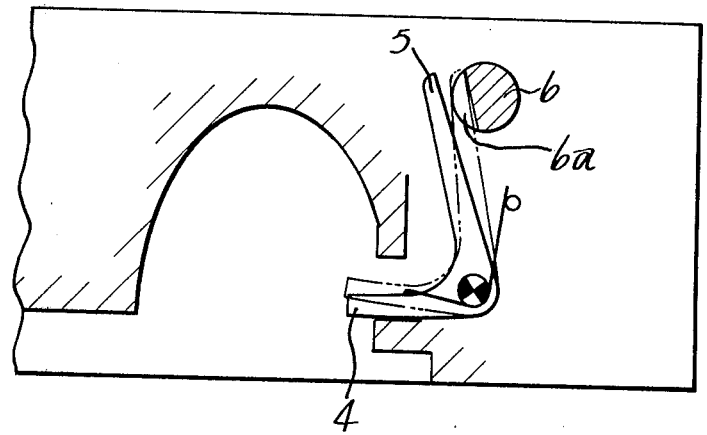

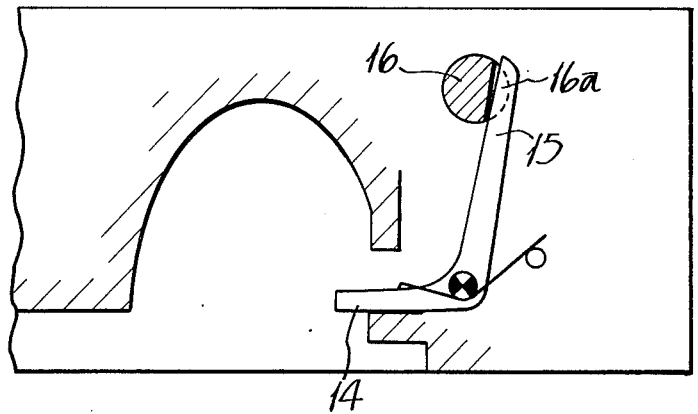
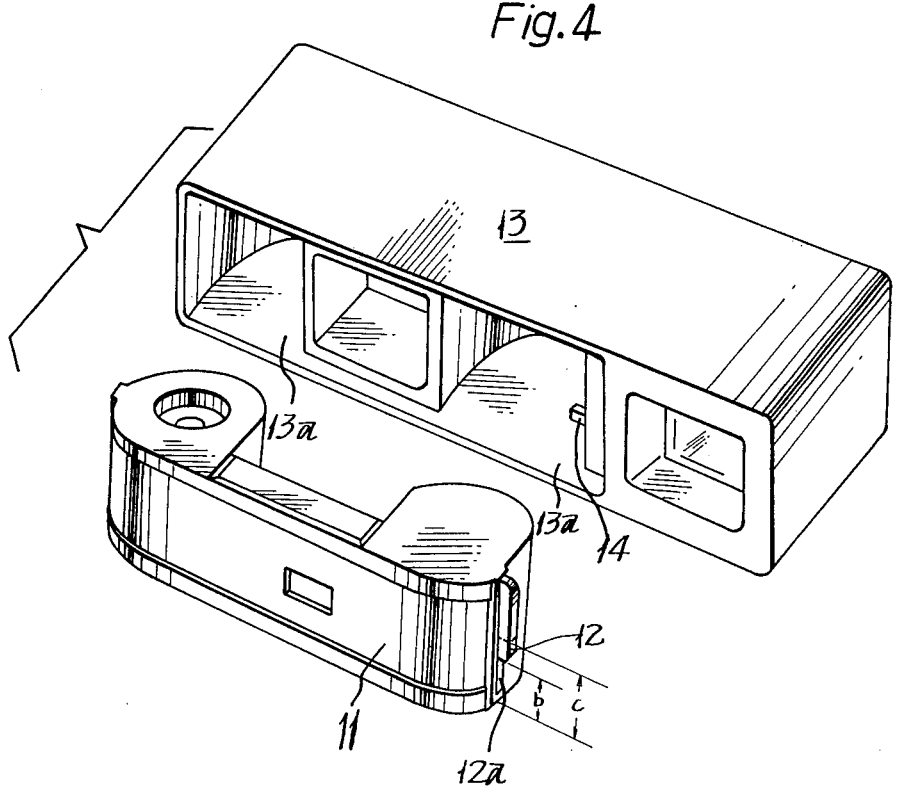

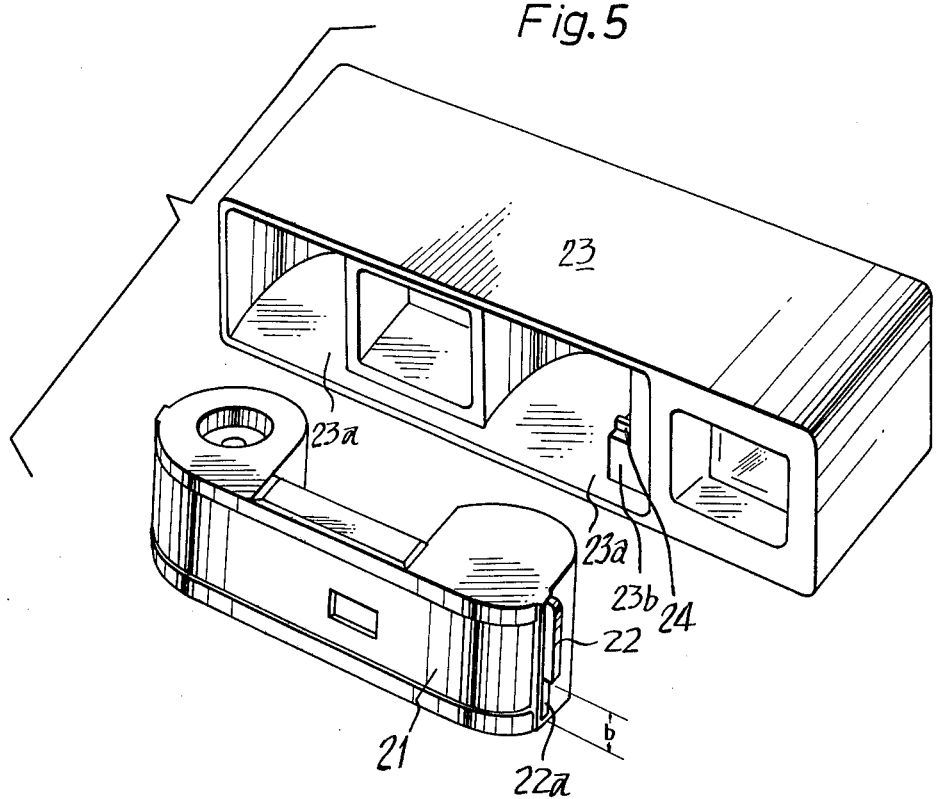
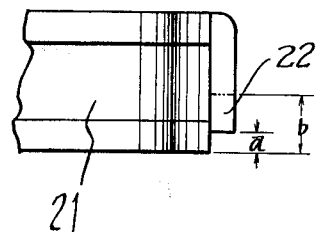 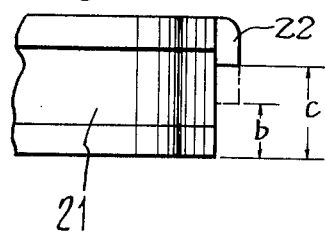

PHOTOGRAPHIC CAMERA EMPLOYING A CARTRIDGE FILM

BACKGROUND OF THE INVENTION

The present invention relates generally to improvements in a photographic camera employing a cartridge film and it relates more particularly to a camera which operatively accepts only a cartridge of film having a predetermined sensitivity and which cannot be inadvertently operatively loaded with a cartridge of film having a sensitivity other than said predetermined sensitivity.

There has been heretofore known a simplified photographic camera employing a cartridge film in which the photographic sensitivity of the film employable with the camera is predetermined to a given sensitivity value (for example, ASA 100) so that the mechanism for compensating for different film sensitivities which are found in the more sophisticated camera is omitted. With a camera of the above construction, the proper exposure is obtained only when the photographic film having such a predetermined sensitivity is employed. For example, in the case of a camera adapted for only ASA 100 film as above, any film may be employed ranging in sensitivity from ASA about 80 to ASA about 120, wherein compensation for overexposure or underexposure is normally provided by the film latitude. However, because of their same contour, shape and size, any of the film cartridges can be loaded into the camera, irrespective of their dissimilar sensitivities. This leads to the disadvantage that the photographer may inadvertently load the camera with a film having an incompatible or nonconforming sensitivity. In the above example, a film having a sensitivity in which compensation for overexposure or underexposure is not provided by film latitude, e.g., ASA 800 or ASA 16, would not be able to obtain the desired proper exposure.

SUMMARY OF THE INVENTION

It is therefore a principal object of the present invention to provide an improved camera and film cartridge system.

It is another object of the present invention to provide a photographic camera employing a cartridge film, the camera being such that when it is inadvertently loaded with a cartridge having a sensitivity value other than the film sensitivity for which the camera is designed, the camera is rendered photographically inoperative so that improper exposure photographing which would occur with the use of a cartridge of film having such incompatible or nonconforming sensitivity (hereinafter referred to sometimes as a nonconforming cartridge) is precluded.

It is still another object of the present invention to provide a photographic camera employing a cartridge which precludes the loading and use of nonconforming cartridges with which cannot be obtained proper exposure and thereby prevents a wasteful consumption of film and which eliminates the possibility of failure in photographing fleeting scenes or objects such as the taking of souvenir pictures.

A further object of the present invention is to provide a camera and film cartridge device of the above nature characterized by its reliability, low cost, simplicity, ruggedness, ease and convenience of use and great versatility and adaptability.

The above and other objects of the present invention will become apparent from a reading of the following description taken in conjunction with the accompanying drawings.

In a sense, the present invention contemplates the provision of the combination comprising a camera including a photographing related component of the camera and having photographing parameters based on a film having a predetermined sensitivity and having a film cartridge housing cavity, a film cartridge insertable into the camera cavity and having index means in accordance with the sensitivity of the film carried by the cartridge, means for sensing the indexing means communicating with the camera cavity and control means responsive to the relationship between the sensing means and the index means of an inserted cartridge to render the photographing related component alternatively operative and inoperative when the index means designates a film with a sensitivity range which covers and is outside said predetermined sensitivity respectively that is, the camera is operative when the camera predetermined sensitivity is within the cartridge film sensitivity range and is inoperative when the predetermined sensitivity is outside the cartridge film sensitivity range or latitude. The camera photographing component which is controlled may be normally operative and rendered inoperative when an indexed cartridge of improper sensitivity is inserted or is normally inoperative and is rendered operative when the inserted indexed cartridge carries film of the proper sensitivity. Along the photographing related components which may be controlled by the indexed film cartridge are the camera shutter release member or mechanism, a camera film advancing member, the camera view finder and the like.

BRIEF DESCRIPTION OF THE DRAWINGS

FIG. 1 is a perspective view of a preferred embodiment of the present invention showing the film cartridge in camera extracted position;

FIG. 2 is a fragmentary diagrammatic plan view, in section, of the camera in which several important component members thereof are shown in exaggerated scale;

FIG. 3 is a view similar to FIG. 2 of another embodiment of the present invention;

FIG. 4 is a view similar to FIG. 1 showing the general construction of the embodiment of FIG. 3;

FIG. 5 is a view similar to FIG. 1 showing still another embodiment of the present invention;

FIG. 6 (a) and (b) are respectively fragmentary front elevation views of cartridges as used in the embodiment depicted in FIG. 5.

DESCRIPTION OF THE PREFERRED EMBODIMENTS

Figure 7:
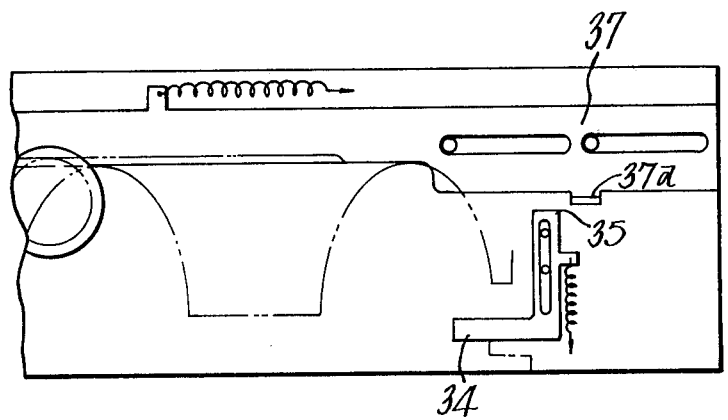
FIGS. 7 to 9 are respectively diagrammatic plan views each showing several important component members of further embodiments of the present invention.

Referring now to FIGS. 1 and 2 of the drawing which illustrate a preferred embodiment of the present invention, the reference numeral 1 generally designates a film-loaded cartridge provided with an index or signal member 2 adapted to transmit the film sensitivity information to the camera body and projects beyond a side wall of the film cartridge 1. The signal member 2 is foreshortened or provided at one end thereof, with a notch portion 2a which varies in length or dimension according to the sensitivity of the film contained in the cartridge. Thus, the notch 2a has a dimension b for a cartridge loaded with a photographic film whose sensitivity is equal to the predetermined sensitivity for which the camera 3 is designed or with a cartridge loaded with a photographic film whose sensitivity lies within the tolerable range which is covered by the exposure latitude of the film. The notch dimensions a and b are from the bottom of cartridge 1.

In the case of a cartridge containing a film whose sensitivity is different from the predetermined sensitivity for the camera side, i.e., a nonconforming cartridge, the notch is formed with a dimension or length a (which may be equal to zero) which is smaller than dimension b. Indicated by reference numeral 3a is a film cartridge chamber or cavity into which projects a sensing member 4 adapted to detect the film sensitivity information from the index or signal member 2. The sensing member 4 is disposed in a position such that it lies higher than dimension a and lower than dimension b as measured from the bottom of chamber 3a. Thus, the sensing member 4 is disposed in such a position that when the camera is loaded with a cartridge, the index notch 2a of which has a dimension of b, the sensing member 4 fits into the notch 2a but, upon loading of a nonconforming cartridge, the notch of which has a dimension a, it does not fit into the notch but abuts against the signal member 2.

The sensing member 4 is formed so that, at one end thereof, it is movable forward and backward, with the other end thereof being associated in operative relation with a control means 5 for locking the shutter release mechanism. As illustrated in FIG. 2 the sensing member 4 is one arm of a pivoted bell crank spring biased to a retracted position, the other arm defining a control means 5 which is adapted to fit into or engage a notch 6a formed in a shutter release shaft 6 associated with the camera shutter mechanism in the known manner. With the sensing member 4 in the normal undisplaced position as illustrated, the control means 5 remains out of engagement with the notch 6a of release shaft 6 and the camera is in photographically operative condition with the shutter release unlocked. The sensing member 4, when it is in its displaced position as indicated by a broken line in FIG. 2, causes the arm or control means 5 to engage the notch 6a of release shaft 6 and renders the camera photographically inoperative.

Considering now the operation of the mechanism described above, let it be assumed that a cartridge containing a photographic film having the predetermined sensitivity is loaded into the camera. Since this particular cartridge has a notch of dimension b in its signal member 2 (see FIG. 1), the sensing member 4 of the camera element engages the notch on loading of the cartridge so that the sensing member 4 is not displaced by signal member 2. Since the sensing member 4 is not displaced but remains in the undisplaced position, the control means 5 is held in a position disengaged from the notch 6a of release shaft 6 and, hence, the camera remains photographically operative.

However, when the camera is loaded with a nonconforming cartridge such that the notch in its signal member 2 has a dimension a which is less than the dimension b of the notch of a film cartridge having the aforementioned sensitivity, the signal member 2 abuts or engages the sensing member 4 of the camera element, thereby swinging and displacing the sensing member. In response to the displacement of sensing member 4, the control means 5 swings into engagement with and fits into the notch 6a of release shaft 6 and thereby locks the camera shutter release mechanism. Therefore, if the camera is loaded with a cartridge having a nonconforming sensitivity, the camera is rendered photographically inoperative.

In the above described embodiment, the control means 5 is in the unlock position of the shutter release member 6 to render the camera photographically operative when sensing member 4 is in its stationary or retracted position and locks the shutter release mechanism to make the camera photographically inoperative when it is displaced in response to the displacement of sensing member 4. However, the control means and its relationship to release member 6 may be designed to function in a reverse mode. In this modified construction, when the sensing member is in its normal spring biased retracted position, the control means locks the shutter release mechanism to render the camera photographically inoperative and, only when the sensing member is displaced, said means unlocks the shutter release and renders the camera photographically operative.

Thus, as shown in FIGS. 3 and 4 which illustrates a camera 13 according to an embodiment of the invention based on this latter modification, the control means 15 associated in operative relation with sensing member 14 is spring biased to normally engage the notch 16a of release shaft 16 and as the sensing member 14 is displaced, control means 15 is disengaged from the notch 16a in response to such displacement, the mean arms 14 and 15 being the arms of a pivoted bell crank. In this embodiment, the signal member 12 of the nonconforming cartridge has a notch 12a having a dimension of c which is greater than the dimension b of the notch of a cartridge 11 having the aforementioned predetermined sensitivity. The sensing member 14 is disposed above dimension b and below dimension c as measured from the bottom of the cartridge chamber 13a of the camera 13. Therefore, in this embodiment, if the camera is loaded with a film cartridge having said predetermined sensitivity wherein the notch of its signal member 12 has the dimension of b, the sensing member 14 is displaced by the signal member 12, and, therefore, the control means 15 associated in operative relation with sensing member 14 is caused to move out of engagement with the notch 16a to render the camera photographically operative. On the other hand, upon loading of a nonconforming cartridge whose notch has a dimension of c which is greater than the dimension b of the notch of a cartridge with the aforementioned particular sensitivity, the sensing member 14 does not engage the signal member 12, and, therefore, remains in its normal retracted position. Since the control means 15 is not displaced while the sensing member 14 is in its normal position, the former remains engaged by the notch 16a of release shaft 16 as illustrated in FIG. 3 and, accordingly, the camera is photographically inoperative. Advantageously, the signal member 12 has a notch 12a whose height above the base of the camera cartridge chamber is equal to that of the sensing means 14 only when the cartridge film is equal to or has a latitude covering the predetermined sensitivity.

In case the control means 15 is so designed and constructed that, as described above, it unlocks the shutter release mechanism only when sensing member 14 is displaced, still another embodiment such as the one illustrated in FIG. 5 is employed to advantage. Thus, in the embodiment shown in FIG. 5, the signal member 22 of cartridge 21 loaded with a film having a predetermined sensitivity is provided with a notch having a dimension equal to $b$. On the other hand, a cartridge loaded with a film having a nonconforming sensitivity, for example a film with a lower sensitivity, is provided with a notch in its signal member 22 which has a dimension of $a$ which is smaller than the dimension $b$ of the corresponding notch of the cartridge of film having said predetermined sensitivity (see FIG. 6a). In a cartridge of film having a higher sensitivity, its signal member 22 is provided with a notch having dimension $c$ which is greater than the above dimension $b$. (See FIG. 6b). The sensing member 24 associated in operative relation with the arm defining control means in the manner of the last described second embodiment is disposed above dimension $b$ and below dimension $c$ as measured from the bottom of chamber 23a of camera 23 as in the aforedescribed second embodiment.

Disposed in, and along a side wall of the chamber 23a is an arresting means or abutment 23b which rises from its bottom and projects to a level just below the sensing member 24.

In the above camera construction, the sensing member 24 is displaced only when the camera element is loaded with a cartridge having the predetermined sensitivity wherein the notch of its signal member 22 has a dimension $b$, whereupon the control means or arm associated in operative relation with the sensing member 24 is actuated to unlock the shutter release mechanism as earlier described with reference to camera 13. Conversely, when the same camera is loaded with a cartridge of film having a lower sensitivity wherein the notch of its signal member 22 has a dimension $a$ which is smaller than dimension $b$, the signal member 22 comes into abutment with the arresting means 23b, thus being prevented from displacing the sensing member 24. In the case of a cartridge of film having a higher sensitivity wherein the notch of its signal member 22 has a dimension $c$, the signal member 22 passes over the sensing member 24, thus failing to displace sensing member 24 as in the case of the afore-described second embodiment. Therefore, neither a cartridge of film having a nonconforming sensitivity wherein the notch of its signal member 22 has a dimension $a$ nor such a cartridge wherein its notch has a dimension $c$ is able to displace the sensing member 24 so that upon loading of such a cartridge, the control means of the camera locks the shutter release mechanism, thereby rendering the camera photographically inoperative.

Although the foregoing description pertains only to the construction wherein control means locks the shutter release mechanism to interfere with the direct photographic functioning of the camera, this invention is not limited to the particular construction but includes other constructions, for example, constructions such that, upon loading of a nonconforming cartridge, the control means locks the film winding mechanism of the camera, trespasses either partially or completely upon the view finder system or prevents latching of the back cover. Hereinafter, these constructions will be described with reference to the accompanying drawings. For the sake of convenience in explanation, the description will be limited to cases in which the control means normally keeps the camera in a photographically operative condition and, only when sensing member is displaced, applies the factor interferring with the photographic function as in the embodiment shown in FIG. 2.

While it, of course, falls within the scope of this invention to cause the control means to function in a reversed mode as in the embodiments illustrated in FIGS. 3 and so forth, such construction will not be described herein, for one skilled in the art may easily make such changes in design in view of the foregoing and following description.

The embodiment illustrated in FIG. 7 is such that the control means 35 locks the film winding mechanism. Reference numeral 37 indicates a member adapted to wind the film when it is displaced to the left by a predetermined distance. Indicated at 37a is a bent portion or upright lug located on said film winding member. Located at the other end of sensing member 34 is a control means 35 designed and constructed so that when said sensing member 34 is displaced, it comes into the path or locus of movement of bent portion 37a and, thus, engages the same. The control means 35 and the sensing member 34 are defined by the legs of an L-shaped member which is forwardly and rearwardly slidable and spring biased to a retracted position, the sensing member 34 entering the camera cartridge cavity.

In the above construction of the control means 35, the film winding mechanism is locked when the camera is loaded with a nonconforming cartridge, with the result that the camera is rendered photographically inoperative, as a consequence of the relationship described earlier between the levels of sensing member 34 and the film cartridge index notch.

Figure 8:
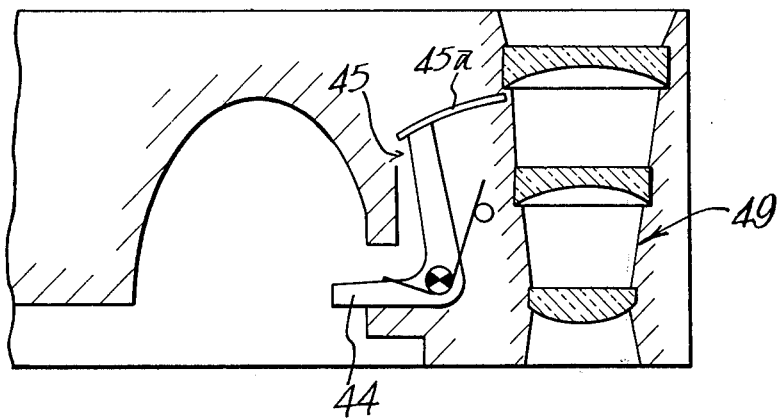

In the embodiment shown in FIG. 8, the factor interferring with the camera photographic functioning is a structure such that the control means 45 includes a mask 45a which either partially or completely intercepts the light through the view finder system 49 of the camera. Referring to FIG. 8 a control means 45 equipped with a mask or cover member 45a is provided at the end of a bell crank arm including the sensing member 45 which is spring biased in a counterclockwise direction as earlier described. The cover member 45a of control means 45 has a sufficient area to cover, either partially or completely, the optical path of the view finder system. Moreover, the control means 45 is so constructed that when sensing member 44 is displaced, the control means 45 is correspondingly displaced in response thereto, causing the cover member 45a to trespass upon the view finder system and, therefore, cover its optical path either partially or completely. With the construction of control means 45 as last described, loading the camera with a nonconforming cartridge would result in a masking of the view finding system, thus rendering the camera photographically inoperative.

Figure 9:
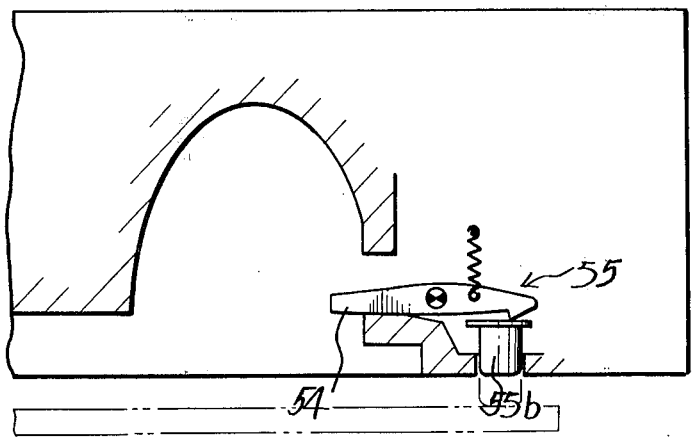

In the embodiment illustrated in FIG. 9, the factor which interferes with the photographic function of the camera is the impossibility of closing and latching the back cover. Thus, disposed at the opposite end of the sensing member 54, which is one arm of a pivoted lever spring biased in a counterclockwise direction at all times, is a control arm or means 55 which engages a projecting member or stop 55b which is displaceable in a direction away from the camera body toward the back cover. The projecting member 55b of control means 55 is freely displaceable toward the back cover and, when so displaced, it prevents the back cover from mating with the camera body cartridge cavity, therefore, preventing the latching of the cover. As the sensing member 54 is displaced, the projecting member 55b of control means 55 is urged to project in a direction away from the camera body toward the back cover. Therefore, with the above construction of the control means 55, the loading of the camera with a nonconforming index provided cartridge which relates to sensing member 54 as earlier described would cause the projecting member 55b to project from the camera body and interfere with an effective closing of the back cover, thus rendering the camera photographically inoperative.

The present invention has been described hereinbefore with reference to the accompanying drawings which show some preferred embodiments of the invention.

It should, however, be understood that the present invention is by no means limited to the particular embodiments described and illustrated and that many changes and modifications may be made by those skilled in the art without departing from the spirit and scope of the invention.

I claim:

1. The combination comprising a camera having photographing parameters based on a film having a predetermined sensitivity and having a film cartridge housing cavity and a cavity cover movable between cavity open and cavity closed positions, a film cartridge insertable into said cavity and having index means in accordance with the sensitivity of the film carried by said cartridge, means for sensing said indexing means communicating with said cavity and control means responsive to the relationship between said sensing means and the index means of an inserted cartridge to alternatively permit or prevent the closing of said cover when said index means designates a film with a sensitivity range which covers or is outside said predetermined sensitivity respectively.

2. The combination of claim 1 wherein said index means comprises a protuberance located on the outer face of said cartridge and positioned in accordance with the sensitivity of the cartridge carried film and said sensing means comprises a movably mounted sensing finger projecting into said cavity and positioned in accordance with said predetermined sensitivity and movable between an actuated and deactuated position in response to the spatial relationship between said index protuberance on an inserted cartridge and said sensing finger, said control means being responsive to the state of actuation of said sensing finger.

3. A photographic camera having a chamber for a film cartridge which is provided with a signal member physically varying according to the sensitivity of the film carried in said cartridge, and a back cover movable between an open position providing access to said chamber and a closed position for shielding said chamber, said camera comprising:
a preventing means for preventing the movement of said back cover to said closed position upon the loading of the camera with a cartridge having a signal member at variance with a predetermined signal member, and permitting the back cover to move to said closed position when the camera is loaded with the cartridge having said predetermined signal member.

4. A photographic camera as set forth in claim 3 wherein said preventing means includes:
a sensing member located in the body of said camera and movable between a first position and a second position, said sensing member being displaced from said first position to said second position when the camera is loaded with a cartridge having a signal member at variance with said predetermined signal member, but undisplaced from said first position when the camera is loaded with a cartridge having said predetermined signal member; and
a preventing member movable in response to said sensing member between a preventing position preventing the movement to the closed position of said back cover and a release position permitting said back cover to move to said closed position, said preventing member being normally in the release position but being displaced from said release position to said preventing position in response to the displacement of said sensing member from said first position to said second position.

5. A photographic camera as set forth in claim 3 wherein said preventing means includes:
a sensing member located in the body of said camera and movable between a first position and a second position, said sensing member being displaced from said first position to said second position when the camera is loaded with a cartridge having said predetermined signal member but undisplaced from said first position when the camera is loaded with a cartridge having a signal member of a configuration other than that of said predetermined signal member; and
a preventing member movable between a preventing position preventing the movement to the closed position of said back cover and a release position permitting said back cover to move to said closed position, said preventing member being normally in the preventing position but being displaced from said preventing position to said release position in response to the displacement of said sensing member from said first position to said second position.

6. A photographic camera as set forth in claim 3 wherein said preventing means includes:
a projecting portion which is located in said cartridge chamber of the camera, said projecting portion being so formed as to engage a signal member having a predetermined configuration but not to engage a signal member having a configuration other than said predetermined configuration for preventing the loading of a cartridge having such signal member at variance with said predetermined configuration.

7. In a photographic camera having a film cartridge chamber for receiving a film cartridge which is provided with a signal member in the form of a rib on the peripheral wall, said signal member being of three types in accordance with the length of the signal member, with the first type being representative of the sensitivity of the film which conforms to the camera for proper exposure and second and third types being representative of the sensitivity of films which are lower or higher speed than that of said first type and with which proper exposure cannot be obtained, and said film cartridge having approximately the same size in its overall shape irrespective of whatever types of signal member is formed with said film cartridge, said camera comprising:
a projecting portion which is located in said cartridge chamber for preventing the loading of the cartridge which is provided with the signal member having a configuration of said second type; and
control means for preventing the photographic function of the camera when the camera is loaded with a cartridge having a signal member having a configuration of said third type.

8. A photographic camera as set forth in claim 7 wherein said control means includes:
- a sensing member located in the body of said camera and movable between a first position and a second position, said sensing member being displaced from said first position to said second position when the camera is loaded with a cartridge having a signal member having a disposition of said first type but being undisplaced from said first position when the camera is loaded with a cartridge having a signal member having a disposition of said third type; and
- a control member movable between a preventing position preventing the normal photographic functioning of the camera and a release position rendering said camera photographically operable, said control means being normally in said preventing position but being displaced from said preventing position to said release position in response to the displacement of said sensing member from said first position to said second position.

9. A photographic camera as set forth in claim 8, wherein said camera includes a shutter release member and said control member includes an arresting portion for arresting the displacement of said shutter release member.

10. A photographic camera as set forth in claim 8, wherein said camera includes a film winding mechanism and said control member includes an arresting portion for locking said film winding mechanism.

11. A photographic camera as set forth in claim 8, wherein said camera includes a view finder and said control member includes a cover portion adapted to intercept said view finder system to at least partially cover its optical path.

* * * * *